Oct. 1, 1963
H. OSTERHOUDT
3,105,368
SPEEDOMETER CABLE
Filed Dec. 10, 1962
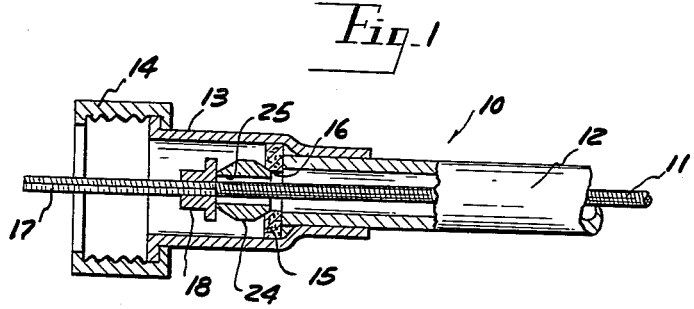
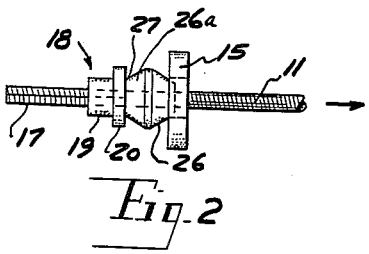
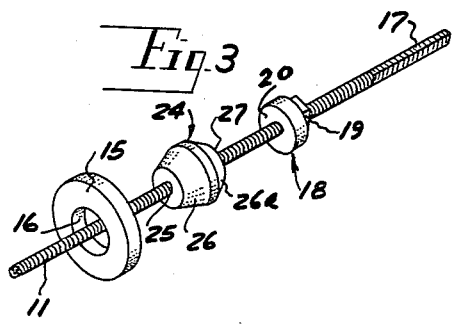
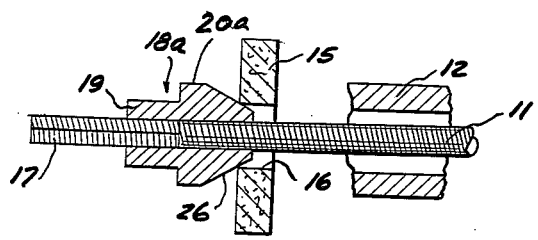
INVENTOR.
HARRY OSTERHOUDT
BY Callen, Sloman & Cantor
ATTORNEYS United States Patent Office 3,105,368
Patented Oct. 1, 1963

3,105,368
SPEEDOMETER CABLE
Harry Osterhoudt, Detroit, Mich., assignor to Perfection Automotive Products Corporation, Detroit, Mich., a corporation of Michigan
Filed Dec. 10, 1962, Ser. No. 243,459
4 Claims. (Cl. 64—4)

This invention relates to a speedometer cable useful in automotive vehicles and the like.

Automotive vehicles are normally provided with speedometers operated by a long cable having one end connected to the speedometer head mechanism and its opposite end connected and driven by a gear means connected in some manner to the wheels or the power transmission of the vehicle. The conventional speedometer cable comprises a coiled wire type, flexible, power transmitting shaft which is surrounded by a protective, semi-rigid, tubular sheathing. The end of a shaft which connects to the speedometer head mechanism is conventionally swaged into a square cross-section with the junction between the squared portion and the otherwise round shaft body portion covered by a bearing collar arranged to press against a washer through which the cable passes, the washer serving to center the shaft end relative to the sheathing.

The shaft rounded portion, which passes through the hole in the washer being inherently rough, acts like a file, due to whipping of the shaft as it rotates, and files the hole of the washer larger and larger as time goes by. This results in increased whipping or lateral movement of the shaft and causes the clicking noise and erratic movement of the speedometer needle so commonly observed in automobiles, as well as permitting grease and oil to leak out of the sheathing.

Hence, it is an object of this invention to provide a means for eliminating the wearing or filing of the washer hole, such means comprising a bead arranged on the shaft, between the bearing collar and the washer, to eliminate contact between the rough surfaced shaft and the washer and with the bead being shaped to automatically self-center and self-adjust relative to the washer.

These and other objects and advantages of this invention will become apparent upon reading the following description of which the attached drawings form a part.

In these drawings:

FIG. 1 is an elevational cross-sectional view of the end of the speedometer cable which connects to the speedometer head mechanism.

FIG. 2 is an elevational view of the speedometer cable shaft, collar, centered washer and bead.

FIG. 3 is a perspective view of the parts spaced along the shaft for illustrative purposes.

FIG. 4 is an enlarged, cross-sectional view, similar to FIG. 2, but showing a modification.

The speedometer cable 10 (see FIG. 1) conventionally includes a coiled wire type, flexible power transmitting shaft 11 surrounded by a protective tubular sheathing 12 which is semi-rigid, that is, it can be bent around corners and will normally hold its bent shape. The end of the sheathing is formed by a metal tube 13 secured to the body of the sheathing 12 and having a cylindrically shaped, internally threaded fitting 14 arranged for threadedly engaging a corresponding fitting on the speedometer head (not illustrated).

A washer 15 is clamped within the tube 13 with the shaft 11 passing through its central opening 16. The washer normally is formed of a pressed fiber material or of a suitable plastic material and functions to center the end of the cable relative to the end of the sheathing and to reduce whipping of the shaft end relative to the sheathing and the speedometer head.

The end 17 of the shaft is swaged into a squared cross-section to fit into a correspondingly shaped socket in the speedometer head (not shown). A collar 18 surrounds the shaft at the juncture between the round body portion and the squared end portion of the shaft, with the collar having a squared sleeve portion 19 swaged or staked on the shaft portion 17 and also having a flattened end bearing surface 20 arranged to bear against the washer 15.

The shaft 11 is normally held under tension, that is, it is pulled in the direction of the arrow shown in FIG. 2 while it is rotated so that the collar bearing surface 20 rubs against the surface of the washer 15 and the shaft is centered by the washer relative to the sheathing. The shaft tends to whip to some extent, as it is rotated. Hence, its wire coil, rough surface files the hole in the washer larger and larger, the longer it is used and it is this enlargement of the hole which creates the problems mentioned above.

The novelty of this invention relates to a bead 24 having an opening 25 through which the shaft is loosely inserted and which is arranged between the collar 18 and the washer 15 (see FIG. 3). The opposite ends of the bead 24 are formed in a truncated, conical shape 26 and 26a. End 26 extends into the washer opening 16 a short distance and forms a bearing, relative to the washer, which is self-centering and self-adjusting, even if the washer hole wears slightly larger, and thus prevents the rough surface of the shaft from filing the washer.

The small end 27 of the bead contacts the bearing surface 20 of the collar so that the collar pushes the bead against the washer and the bead may rotate relative to the washer and the collar under the influence of friction of the collar, although its speed of rotation, due to the frictional contact with the washer, would normally be considerably slower than that of the shaft.

Modification of FIG. 4

FIG. 4 illustrates a modification wherein the bead is formed with only one truncated conical shape 26 to fit into the opening 16 of the washer 15 and is formed integral with the bearing portion 20a of the collar 18a. The operation is otherwise similar to that described above.

The bead 24 is preferably constructed of brass or other non-ferrous metal or nylon or other plastic material having good wear characteristics, such as Teflon, mylar, polyethelene, polystyrene, etc. Said bead may be either molded or machined.

Heretofore, speedometer or tachometer cables have been known to break or wear out at or adjacent the points in the cable where said cable engages the washer 15, and adjacent the collar 18. Another advantage of the present invention, therefore, resides in the prolonging of the life of the cable reducing or preventing breakage at this point in the cable heretofore recognized as a weak point.

This invention may be further developed within the scope of the following claims. Accordingly, it is desired that the foregoing description be read as being merely illustrative of an operative embodiment of this invention and not in a strictly limited sense.

I now claim:

1. In a speedometer cable having a coiled wire type, flexible, power transmitting shaft, surrounded by a tubular sheathing and having one end portion of said shaft extended through a central opening of a washer secured within the sheathing transversely to the shaft for centering said shaft end portion relative to the sheathing and a bearing collar surrounding and fixed to the shaft between the free end of said shaft portion and the washer, the improvement comprising a bead, having a central hole, arranged between and in contact with the bearing collar and the washer with the shaft passing through the hole in said bead; the portion of the bead facing the washer being formed in a truncated conical shape with the small end thereof facing towards the washer and inserted for a short distance into a central opening in said washer, and with the conical surface bearing against the edge defining the opening in the washer for centering the shaft relative to said washer and holding the shaft against direct contact with the inner surface defining the opening in the washer.

2. A construction as defined in claim 1, and wherein the hole in the bead is slightly larger than the diameter of the shaft so that the shaft is loose within said bead hole, and the bearing collar end which faces towards the washer being pressed against, but being rotatable relative to, the end of the bead which it contacts and thus pushing the bead into contact with the washer.

3. A construction as defined in claim 1 and wherein the bead portion which contacts the bearing collar is integrally joined thereto.

4. In a speedometer cable formed of a coiled wire type, flexible, round in cross-section, power transmitting shaft surrounded by a tubular sheathing, with one end portion of the shaft being formed into a substantially square in cross-section portion integrally joined with the round in cross-section body of the shaft, and a bearing collar surrounding and fixed to the shaft at and covering the junction between the square and round portions, and a washer having a central opening arranged and held within the sheathing transversely to the shaft adjacent the bearing collar with the shaft round body passing loosely through said opening, the improvement comprising a bead, having a central hole arranged between and in contact with the bearing collar and the washer with the shaft passing through the hole in said bead; the portion of the bead facing the washer being formed into a truncated conical shape with the small end thereof facing towards the washer and being inserted for a short distance into the central opening in said washer and with the conical surface bearing against the edge defining the opening in the washer for centering the shaft relative to said washer and holding the shaft against direct contact with the inner surface defining the opening in the washer, and with the bearing collar being pressed against the end of the bead which is contacts to thus press the bead conical portion against the washer.

References Cited in the file of this patent
UNITED STATES PATENTS

| | | |
|---|---|---|
| 842,497 | Russell | Jan. 29, 1907 |
| 2,918,808 | Botti | Dec. 29, 1959 |